(12) United States Patent
Fankhauser et al.

(10) Patent No.: US 11,558,654 B2
(45) Date of Patent: Jan. 17, 2023

(54) SYSTEM AND METHOD FOR OPERATING A TRANSMISSION NETWORK

(71) Applicant: Evertz Microsystems Ltd., Burlington (CA)

(72) Inventors: Eric Fankhauser, Burlington (CA); Rakesh Patel, Mississauga (CA); Vince Silvestri, Burlington (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

(21) Appl. No.: 17/322,092

(22) Filed: May 17, 2021

(65) Prior Publication Data
US 2021/0274238 A1 Sep. 2, 2021

Related U.S. Application Data

(63) Continuation of application No. 16/928,590, filed on Jul. 14, 2020, now Pat. No. 11,039,200, which is a
(Continued)

(51) Int. Cl.
*H04N 21/43* (2011.01)
*H04N 21/434* (2011.01)
*H04N 21/44* (2011.01)
*H04N 21/6332* (2011.01)
*H04N 21/643* (2011.01)

(52) U.S. Cl.
CPC ....... *H04N 21/4302* (2013.01); *H04N 21/434* (2013.01); *H04N 21/44* (2013.01); *H04N 21/6332* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 6,378,129 B1 * | 4/2002 | Zetts | H04N 21/2181 725/138 |
| 6,925,072 B1 * | 8/2005 | Grohn | H04B 7/2656 370/461 |

(Continued)

*Primary Examiner* — Hsiungfei Peng
*Assistant Examiner* — Fred Peng
(74) *Attorney, Agent, or Firm* — Bereskin & Parr LLP/S.E.N.C.R.L., s.r.l.

(57) ABSTRACT

Various embodiments are described herein for systems and methods that can be used to operate a media transmission network. In at least one embodiment, the media transmission network comprises a plurality of media processing devices configured to receive and process media streams based on control data. The media transmission network also comprises a controller coupled to the plurality of media processing devices and configured to generate a control signal for some or all of the media processing devices in the network. The controller is configured to determine the timing at which to transmit the control signal to a respective media processing device in order for the instructions in the control signal to be executed at the same time as the media data is received. The controller determines the transmission timing of each control signal by determining the latencies and delays of the network and the devices, such as, for example, network latency, processing delay, and/or control delay.

16 Claims, 8 Drawing Sheets

Related U.S. Application Data continuation of application No. 15/699,076, filed on Sep. 8, 2017, now Pat. No. 10,750,228.

(60) Provisional application No. 62/385,909, filed on Sep. 9, 2016.

(56) References Cited

U.S. PATENT DOCUMENTS

| | | | |
|---|---|---|---|
| 8,891,014 B2 * | 11/2014 | Derer | H04N 5/126 709/248 |
| 9,264,752 B1 * | 2/2016 | Hundemer | H04N 21/812 |
| 10,750,228 B2 | 8/2020 | Fankhauser et al. | |
| 11,039,200 B2 | 6/2021 | Fankhauser et al. | |
| 2006/0107302 A1 | 5/2006 | Zdepski | |
| 2008/0005348 A1 | 1/2008 | Kosiba et al. | |
| 2010/0235486 A1 | 9/2010 | White et al. | |
| 2015/0101003 A1 | 4/2015 | Bull et al. | |
| 2015/0113576 A1 | 4/2015 | Carroll | |

* cited by examiner

SYSTEM AND METHOD FOR OPERATING A TRANSMISSION NETWORK

CROSS REFERENCE TO RELATED APPLICATIONS

The present application is a continuation of application Ser. No. 16/928,590 filed Jul. 14, 2020, which is a continuation of application Ser. No. 15/699,076 filed Sep. 8, 2017 (now issued U.S. Pat. No. 10,750,228), which claims the benefit of the filing date of U.S. provisional patent application Ser. No. 62/385,909, filed on Sep. 9, 2016, the disclosures of which are incorporated herein by reference.

FIELD

The described embodiments relate to methods and systems for operating a transmission network for video signals, and in particular, to methods and systems for operating a transmission network for video signals based on control signals received from a controller.

BACKGROUND

In a large broadcasting facility or other facility where many video signals are transmitted over a complex communication network, managing efficient usage of the communication network to provide high throughput of video signals is a complex task. Accordingly, there is a need for systems and methods for operating a transmission network to allow devices coupled to the network to transmit, receive and/or process video in an efficient manner.

SUMMARY

In the various embodiments described herein, the term "content signal" is used to refer to various types of signals either generated within the transmission network or received from external sources by the transmission network. Content signal may include one or more video signals, audio signals, data signals and control signals. The various content signals in a transmission network typically have a common time base.

In various embodiments disclosed herein, the term "video signal" includes a video stream containing moving picture information. In addition to a video stream, a video signal may optionally include other components such as an audio stream, a data stream and/or control streams. Such streams generated from a video signal are referred to herein as "content streams". The various content streams in a transmission network typically have a common time base.

In some cases, the term "video signal" includes a video elementary stream that encodes moving picture information. In addition to a video elementary stream, a video signal may optionally include additional encoded information or components such as audio, system and control elementary streams. A video signal may also be referred to as a program. In such cases, each elementary stream may be encoded using an encoder suitable for that elementary stream. Elementary streams in a particular video signal typically have a common time base. Video elementary streams may be encoded in various formats including MPEG-2, H.264, Quicktime, MPEG-1, MPEG-4, H.261, H.263, H.265 and other video signal encoding formats including various lossy or lossless compression formats. Other elementary streams in the video signal, such as audio information, may be encoded using an appropriate encoding format, such as, for example, AES3, AES67 and other audio signal encoding formats including various lossy or lossless compression formats.

In some cases, elementary streams corresponding to a video signal may be encapsulated into a transport stream (or a packet stream) comprising a series of data packets. In some other cases, the elementary streams may be transmitted using a non-transport stream format.

Each video signal may be received or generated in a variety of digital video formats such as, standard definition serial digital interface (SD-SDI), high definition serial digital interface (HD-SDI), digital video broadcasting asynchronous serial interface (DVB-ASI), or society of motion picture and television engineers (SMPTE) 310M, among many other formats.

In some cases, the various content signals in the transmission network are transmitted within the network in an uncompressed format. In some other cases, the various content signals in the transmission network are transmitted within the network in a compressed format. In some further cases, some content signals in the transmission network may be transmitted in a compressed format, while some other content signals in the transmission network may be transmitted in an uncompressed format.

In one aspect, in at least one embodiment described herein, there is provided a media transmission network comprising a controller and a plurality of video processing devices. The video processing devices are configured to receive and process media streams based on control data received from the controller.

In some cases, the control data is sent from the controller out of band, i.e. not within the same transmission stream as the media data.

In various cases, the controller determines the timing at which to transmit the control data to a video processing device in order for the control data to be executed at the same time the media data is received. The controller determines the transmission timing of control data by calculating the latencies and delays of the network. For example, the controller calculates the network latency, processing delay, and/or control delays based on a synchronized time between all of the networked devices.

In various cases, the various video processing devices in the media transmission network, as well as the controller, are synchronized using the Precision Time Protocol (PTP).

The embodiment may provide the advantages of reduced buffers as well as reduced hardware complexity of the network.

In another aspect, there is provided video signal transmission system comprising a plurality of devices configured to process one or more input signals; and a controller coupled to the plurality of devices, where the controller is configured to transmit synchronous control signals to the plurality of devices such that each device operates on a corresponding one or more input signals, received simultaneously, based on instructions contained in the respective control signal received from the controller, and where each control signal is transmitted to a respective device simultaneously with the corresponding one or more input signals such that the respective device processes the corresponding one or more input signals based on the corresponding control signal as soon as the corresponding one or more input signals are received by the respective device.

In some cases, the control signal transmitted from the controller is out-of-band from the corresponding one or more input signals. In some other cases, the control signal is transmitted in-band with the corresponding one or more input signals by the controller.

In some cases, the controller is configured to determine a network delay in the system and transmit the control signal to the respective device based on the network delay.

In some other cases, the controller is configured to determine a processing delay for each device in the system and transmit the control signal to the respective device based on the processing delay.

In some further cases, the controller is configured to determine control latency for each device in the system and transmit the control signal to the respective device based on the control latency, the control latency identifying a reaction time associated with the respective device.

In some other cases, the controller is configured to determine one or more of the network delay, processing delay and control latency.

In various cases, the respective clocks of each of the plurality of devices and the controller are synchronized to a common timebase.

In some cases, the plurality of devices and the controller are synchronized using the PTP protocol.

In some cases, the control signals transmitted to the plurality of devices are multiplexed into a single signal by the controller before transmission.

In a further aspect, there is provided a video signal transmission system comprising a plurality of media processing devices synchronized with each other, each media processing device configured to receive one or more content streams; a controller coupled to, and synchronized with, the plurality of media processing devices, the controller being configured to generate a control signal for controlling the operation of one or more media processing devices, the control signal being out-of-band from the one or more content streams; and a network coupled to the plurality of media processing devices and the controller to facilitate communication between the plurality of media processing devices and the controller, the controller being configured to determine a time of transmission of the control signal such that the control signal is received by a first media processing device simultaneously with the one or more content streams to be processed by that media processing device.

In some cases, the controller determines the time of transmission of the control signal based on a delay associated by with traversing the network by the control signal.

In some cases, the controller determines the time of transmission of the control signal based on a processing delay associated with the first media processing device.

In some cases, the controller determines the time of transmission of the control signal based on a control delay, the control delay identifying a reaction time associated with the first media processing device.

In some cases, the control signal is a multiplexed signal containing control information for one or more media processing devices in addition to the first media processing device.

In another aspect, there is provided a method of operating a video signal transmission system, the method comprising: providing a plurality of media processing devices, each media processing device being configured to receive one or more content streams; providing a controller coupled to the plurality of media processing devices; synchronizing the plurality of media processing devices and the controller with each other; generating one or more control signals, at the controller, the one or more control signals being configured to control the operation of respective one or more of the plurality of media processing devices; generating a time of transmission of each of the one or more control signals, at the controller, such that the one or more control signals are received by the respective one or more media processing devices simultaneously with the respective one or more content streams; and processing the one or more content streams by the respective one or more media processing devices based on the corresponding control signal.

In some cases, the method further comprises determining a processing delay for each of the one or more media processing devices; and transmitting the control signal to the respective media processing device based on the processing delay.

In some cases, the method further comprises determining a network delay for the video signal transmission system; and transmitting the control signal to the respective media processing device based on the network delay.

In some cases, the method further comprises determining a control delay associated with each of the one or more media processing devices; and transmitting the control signal to the respective media processing device based on the control delay.

In some cases, the plurality of media processing devices and the controller are synchronized with each other based on a PTP protocol.

In some cases, the method further comprises transmitting the one or more control signals to the respective one or more media processing devices out-of-band from the respective one or more content streams.

In some cases, the method further comprises transmitting the one or more content streams to the plurality of media processing devices in a transport stream.

In yet another aspect, there is provided a method of managing media streams over an IP network, the method comprising: receiving one or more media streams at one or more media processing devices, each media stream comprising a plurality of media packets; providing a controller coupled to the one or more media processing devices over the IP network; synchronizing the one or more media processing devices and the controller with each other; generating one or more control signals, at the controller, the one or more control signals being configured to control the operation of the respective one or more media processing devices; generating, by the controller, a time of transmission of each of the one or more control signals such that the one or more control signals are received by the respective one or more media processing devices simultaneously with the respective one or more media streams; and processing the one or more media streams by the respective one or more media processing devices based on the corresponding control signal.

In some cases, the method further comprises determining a processing delay for each of the one or more media processing devices; and transmitting the control signal to the respective media processing device based on the processing delay.

In some cases, the method further comprises determining a network delay for the video signal transmission system; and transmitting the control signal to the respective media processing device based on the network delay.

In some cases, the method further comprises: determining a control delay associated with each of the one or more media processing devices; and transmitting the control signal to the respective media processing device based on the control delay.

In some cases, the one or more media processing devices and the controller are synchronized with each other based on a PTP protocol.

In some cases, the method further comprises transmitting the one or more control signals to the respective one or more media processing devices out-of-band from the respective one or more media streams.

In some cases, the method further comprises transmitting the one or more media streams to the one or more media processing devices in a transport stream.

In some cases, the transport stream is a MPEG-2 transport stream.

In another aspect, there is provided a system of managing media streams over an IP network, the system comprising: one or more media processing devices configured to receive one or more media streams, each media stream comprising a plurality of media packets; and a controller coupled to the one or more media processing devices over the IP network, the one or more media processing devices and the controller being synchronized with each other, wherein the controller is configured to generate one or more control signals, the one or more control signals being configured to control the operation of the respective one or more media processing devices, and wherein the controller is further configured to generate a time of transmission of each of the one or more control signals such that the one or more control signals are received by the respective one or more media processing devices simultaneously with the respective one or more media streams, wherein the one or more media streams are processed by the respective one or more media processing devices based on the corresponding control signal.

In some cases, the controller is configured to determine a processing delay for each of the one or more media processing devices and transmit the control signal to the respective media processing device based on the processing delay.

In some cases, the controller is configured to determine a network delay for the video signal transmission system and transmit the control signal to the respective media processing device based on the network delay.

In some cases, the controller is configured to determine a control delay associated with each of the one or more media processing devices and transmit the control signal to the respective media processing device based on the control delay.

In some cases, the one or more media processing devices and the controller are synchronized with each other based on a PTP protocol.

In some cases, the controller is configured to transmit the one or more control signals to the respective one or more media processing devices out-of-band from the respective one or more media streams.

In some cases, the one or more media streams are transmitted to the one or more media processing devices in a transport stream.

In some cases, the transport stream is a MPEG-2 transport stream.

In a further aspect, there is provided a video signal transmission system for managing media signals over an IP network, the system comprising: a plurality of devices configured to process one or more input signals, each input signal comprising a plurality of media packets; a controller coupled to the plurality of devices over the IP network, wherein the controller is configured to transmit synchronous control signals to the plurality of devices such that each device operates on a corresponding one or more input signals, received simultaneously, based on instructions contained in the respective control signal received from the controller, and where each control signal is transmitted to a respective device simultaneously with the corresponding one or more input signals such that the respective device processes the corresponding one or more input signals based on the corresponding control signal as soon as the corresponding one or more input signals are received by the respective device.

In some cases, the control signal transmitted from the controller is out-of-band from the corresponding one or more input signals.

In some cases, the controller is configured to determine a network delay in the system and transmit the control signal to the respective device based on the network delay.

In some cases, the controller is configured to determine a processing delay for each device in the system and transmit the control signal to the respective device based on the processing delay.

In some cases, the controller is configured to determine a control latency for each device in the system and transmit the control signal to the respective device based on the control latency, the control latency identifying a reaction time associated with the respective device.

In some cases, the respective clocks of each of the plurality of devices and the controller are synchronized to a common timebase.

In some cases, the plurality of devices and the controller are synchronized using the PTP protocol.

In some cases, the control signals transmitted to the plurality of devices are multiplexed into a single signal by the controller before transmission.

In some cases, the one or more input signals are transmitted to the plurality of devices in a transport stream.

In some cases, the transport stream is a MPEG-2 transport stream.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

Figure 1:
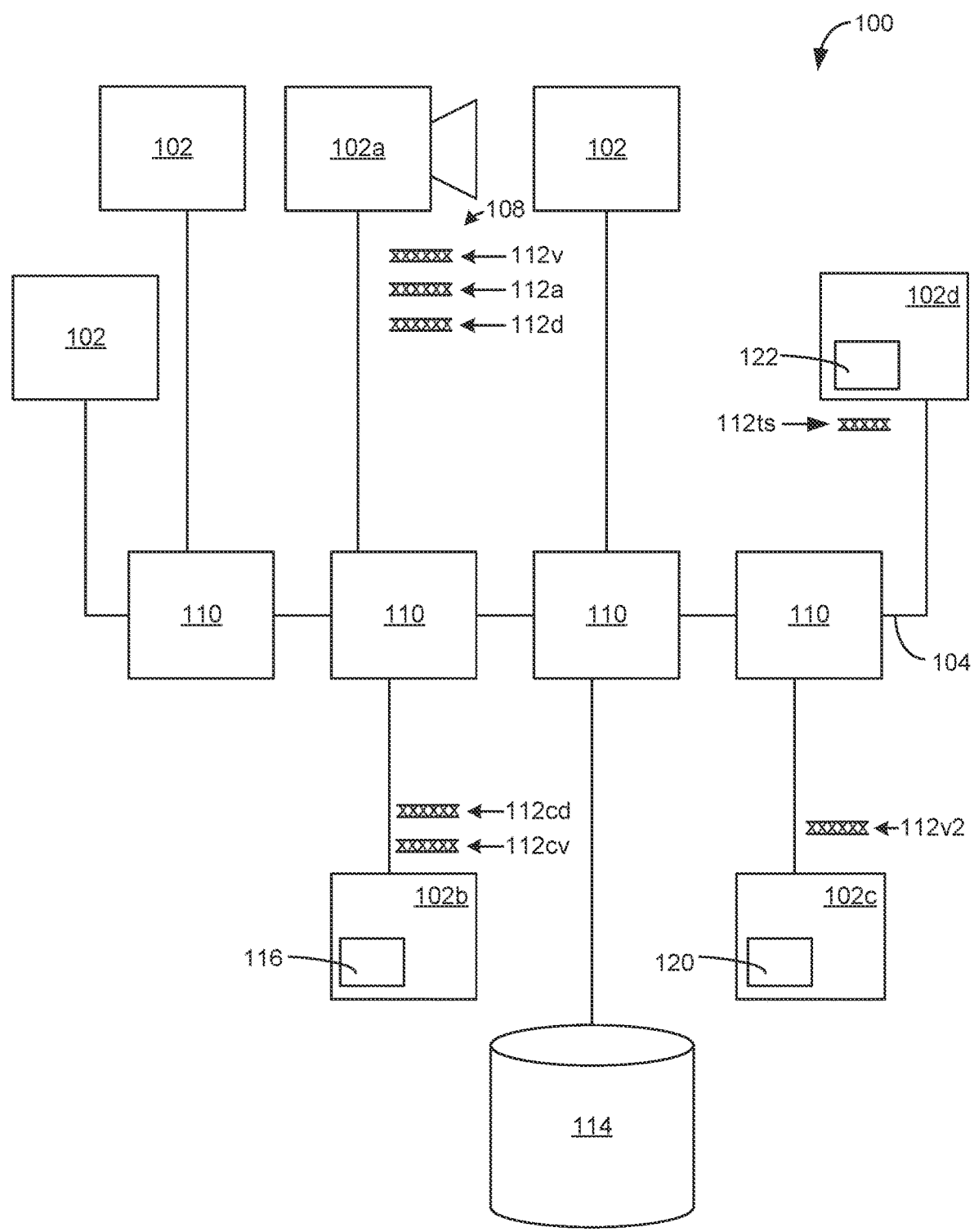
FIG. 1 is an example of a block diagram of a signal transmission system.

Further aspects and advantages of the embodiments described herein will appear from the following description taken together with the accompanying drawings.

DESCRIPTION OF EXAMPLE EMBODIMENTS

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The various embodiments disclosed herein generally relate to systems and methods of operating a transmission network. In particular, the systems and methods relate to transmitting and processing video signals and related data signals and control signals.

A video signal may be transmitted between devices on a transmission network using various interfaces. The Society of Motion Picture and Television Engineers (SMPTE) and other organizations have promulgated various interface standards for the transmission of digital video signals. Some devices may use a proprietary or non-standard interface.

Some examples of SMPTE standards are discussed herein. SMPTE standard 292M (High Definition Serial Digital Interface or HD-SDI) provides an HD-SDI standard for the transmission of digital video signals with a bandwidth of up to 1.485 Gbit/s, which is generally sufficient for the transmission of 720p video. Other interface standards permit the transmission of signals that require higher bandwidth. For example, SMPTE has introduced standard ST-2082 (12G Serial Digital Interface or 12G-SDI) standard that provides a bandwidth of 12 Gbit/s, which is sufficient for the transmission of 2160p60 video signals.

As another example, SMPTE has also introduced standard ST-2022 that relates to transmission of digital video over IP network. For example, ST-2022-1/2 relates to transmission of compressed, constant bit-rate video signals in MPEG-2 transport streams over IP networks. Likewise, ST-2022-3/4 relates to unidirectional transmission of variable (or non-piecewise constant variable) bit rate video signals in MPEG-2 transport stream over IP networks. ST-2022-5/6 relates to transport of high bit rate video signals, such as uncompressed SDI with payload data rates up to 3 Gbit/s, including SD/HD/3G-SDI video over a 10 Gb Ethernet network. ST-2022 standard relates to "multiplex" standard, where the video, audio and ancillary data signals, including blanking and padding, are wrapped up into a single IP stream. In other words, a receiving device interested in receiving just one element of the multiplex signal will have to take the whole stream from the network and extract the relevant part.

SMPTE has introduced further standards for transmission of uncompressed digital video signals. For example, SMPTE has introduced standard ST-2110 that relates to transportation of uncompressed video, audio and ancillary data. According to the ST-2110 standard, the audio, video and ancillary data are separately routable. Using this standard, a recipient device can request one or more of the audio, video or ancillary data, and receive the requested element or elements. ST-2110-10 standard relates to timing, ST-2110-20/21 relates to uncompressed video, ST-2110-30/31 relates to audio, ST-2110-40 relates to ancillary data and ST-2110-50 relates to integration with ST-2022-6 standard.

As discussed above, ST-2110 permits the transmission of various elements of an audio-visual signal, such as audio, video and ancillary data, in separate streams. To sync the various elements, ST-2110 promotes the use of SMPTE standard ST-2059 (PTP or precision time protocol), which relates to synchronization of various devices or equipments in a video broadcast facility. In ST-2110, the separate streams have timestamps and ST-2059 is used to distribute time and timebase to every device in the broadcast facility.

The bandwidth of high speed data transmission networks has steadily increased, resulting in increased use of standard data transmission protocols, such as Internet Protocol (IP), to transmit video signals.

For transmission on an IP (or other data) network, a digital video signal may first be encoded using a selected encoder and then encapsulated into a transport stream according to a video interface standard intended for video signals and the resulting packet stream may then be packetized into a stream of IP packets for transmission on an IP network from a source device to a destination device. At the destination device, the transport stream may be extracted from the IP packet stream and processed as desired. For example, the video signals within the transport stream may be stored, depacketized according to the selected video interface standard and then decoded and displayed on a monitor.

Alternatively, the digital video signal may be directly packetized in an IP packet stream that is transmitted using an IP network and extracted at the destination and processed as desired.

In some situations, an available transmission network may not provide sufficient bandwidth to transmit a program stream. For example, a UHD video signal (2160p60) may require up to 12 Gbit/s of bandwidth while a 10 Gigabit Ethernet (10 GigE) transmission link provides a maximum bandwidth of only 10 Gbit/s. In practice, a 10 GigE network will typically provide less bandwidth than the 10 Gbit/s maximum. The UHD video signal must be divided into two parts and each of the parts transmitted over a separate 10 GigE link, necessitating additional networking hardware and other infrastructure. Similarly, a UHD video signal may have to be divided into eight parts to be transmitted over eight HD-SDI (SMPTE 292M) interfaces.

In other situations, an available transmission network may provide sufficient bandwidth to transmit more than one program stream simultaneously. For example, a 10 GigE transmission link provides sufficient bandwidth to transmit two 1080p60 and one 1080i program streams. In these situations, a transport stream encapsulating both for the program streams may be used to transmit them contemporaneously on the same interface or network.

In some other situations, a digital video signal may be transmitted uncompressed. This may be accomplished, for example, by using the ST-2110 standard, and specifically according to ST-2110-20 standard, which requires the transmission of information relating to active image area of the video signal only, instead of blanking and/or padding information. ST-2110-20 standard supports image sizes up to 32 k×32 k, as well as various colour systems, such as Y'Cb'Cr', RGB, XYZ, and I'Ct'Cp'. ST-2110-20 standard also supports various sampling systems, such as, 4:2:2/10, 4:2:2/12, 4:4:4/16 and more.

In a large broadcasting facility or other facility where many video signals are transmitted over a complex communication network, managing efficient usage of the communication network to provide high throughput of video signals is a complex task. There is a need for a system and method for operating a transmission network to allow devices coupled to the network to transmit, receive and/or process video in an efficient manner. Depending on the standard used, in some cases, there is a need for a transport stream protocol to allow information about transport stream or program stream to be transmitted, allowing devices coupled to the network to transmit and receive video signals from one another and to use and process the video signals. In some other cases, there is a need for efficiently transmitting control signals to the various devices coupled to the network to use and process the video signals efficiently based on the control signals.

Reference is first made to FIG. 1, where a signal transmission system 100 according to an example embodiment is illustrated. System 100 comprises a plurality of devices 102, network 104 and a storage server 114.

Storage server 114 may comprise one or more computer servers, each comprising at least a processor, a network interface and a storage memory. In some cases, storage server 114 may be configured to provide a scalable distributed storage system (e.g., "cloud" storage) in which storage server 114 comprises multiple nodes or computers connected via a network, such as network 104. For example, storage server 114 may be configured to provide a NoSQL database storage scheme. In some cases, storage server 114 may comprise one or more encoders for encoding or re-encoding media streams.

Network 104 may comprise any type of communication network that allows data and control signals to be transmitted between various devices. In this example, data network 104 is an Internet Protocol (IP) network that may be used to couple devices in addition to those illustrated in the figures described herein. In some cases network 104 may comprise a separate data network and a control network. In some other cases, network 104 may include both a data network and a control network.

Devices 102 may include a variety of devices having a processor and a memory. In some cases, devices 102 include media source devices, such as a television camera or film camera etc, which may produce or generate a video signal. In some other cases, devices 102 may comprise a plurality of input interfaces to receive one or more video signals from third party sources. Device 102 may also be an audio capture device, such as a microphone, which may produce an audio signal, transmitted via a suitable interface.

Other types of devices 102 may also be provided. For example, devices 102 may comprise a network file server or media servers as media source devices. Devices 102 may also include video signal processing devices capable to processing video signals received from other devices 102. For example, devices 102 may be configured to generate one or more versions of previously stored media signals.

The devices 102 are coupled to a communication network 104 at respective ports or nodes. Network 104 uses a selected communication protocol, or more typically, a group or suite of protocols, such as TCP/IP to transmit data between devices 102. The available bandwidth of data communication on network 104 will typically be limited by devices 110 (such as network routers, cables, wireless communication devices, switches and their respective software components) that comprise the network and the specific communication protocols implemented on the network. Some portions of the network 104 may operate at a different bandwidth than other portions.

As illustrated, a first group of content streams 112 corresponding to a video signal 108 is transmitted from a device 102a, which is a video generation device, such as a camera. Device 102a may include encoders to generate various types of elementary streams corresponding to the video signal 108.

In the illustrated embodiment, camera 102a includes a microphone and provides a video stream 112v, an audio stream 112a and a data stream 112d. Data stream 112d may contain data ancillary to the audio and video streams such as information about the time at which the streams 112 were generated, camera setting and configuration information, etc. 102b The content streams 112 including the video stream 112v, audio stream 112a and data stream 112d share a common time base. Content streams 112 are routed to a storage server 114 connected to network 104, such as a file server, where they are indexed and stored. Storage server 114 is accessible to other devices coupled to network 104, which can selectively retrieve files corresponding to content streams from the data store based on the names of the files, metadata relating to the files or the content streams and other information relating to the files.

In some cases, audio stream 112a is transmitted from device 102a to device 102b, where device 102b is a signal processing device. In the illustrated embodiment, device 102b includes a closed caption generator 116. Closed caption generator 116 is configured to automatically transcribe spoken word audio in the audio stream 112a and generate a closed caption data file 112cd containing an entry for some or all of the spoken word audio in the audio stream.

In an example embodiment, each entry in the closed caption data file 112cd includes a text entry as well as at least one time indicia for the text entry. The text entry is configured to be displayed on a monitor when corresponding audio is spoken during reproduction of the audio stream 112a. The at least one time indicia for the text entry indicates the time at which the text is to be displayed relative to the audio stream 112a. A time indicia may share the time base of the audio stream 112a (and thus also the video stream 112v). A time indicia may be in the form of a time offset relative to the start of the audio stream 112a. Other time indicia may be used.

In the illustrated embodiment, closed caption generator 116 also generates a closed caption video stream 112cv corresponding to the audio stream 112a. Closed caption video stream 112cv runs for the same length of time as audio stream 112a, and shares a common time base with audio stream 112a. Closed caption video stream 112cv includes a text element in the video corresponding to and displayed contemporaneously with spoken word in the audio file. In most cases, the closed caption video stream 112cv is effectively transparent in any part of the image where closed caption text is not displayed. For example, non-closed caption text parts of the image may be rendered in a key color that can be identified in subsequent processing to allow another video image to be shown behind the text using a chroma key compositing process.

In the illustrated embodiment, the closed caption data file 112cd and closed caption video file 112cv are routed to storage server 114 through network 104, where they are stored and indexed as corresponding to video stream 112v, audio stream 112a and data stream 112d.

The example above is a simple case of the proliferation of content streams that can be generated corresponding to a single video signal. In commercial video processing and broadcast facilities, hundreds or thousands of content signals, including video signals, are generated, processed, stored, retrieved and transmitted, often simultaneously. Many of the content signals will have multiple versions having, for example, different resolutions or formats. Numerous related and ancillary signals and/or streams, such as audio, data, timing and other signals and/or streams may correspond to each video signals.

In cases where a video signal must be divided spatially into portions to allow for transmission using multiple signal transmission links, each of the different video streams and some ancillary streams may exist for each portion.

Figure 2:
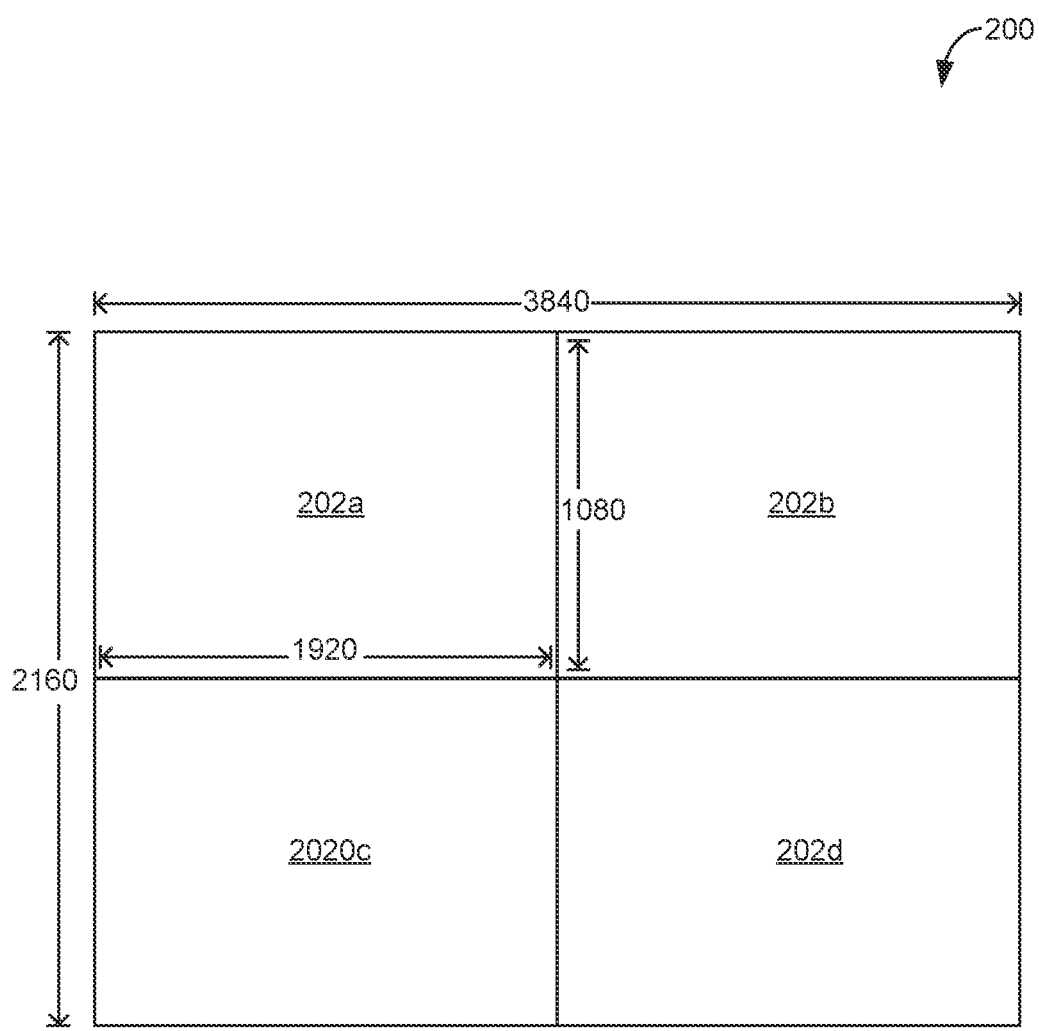
FIG. 2 is an example of a block diagram illustrating a spatially divided video signal.

For example, FIG. 2 illustrates a UHD (2160p60) video signal 200 having a resolution of 3840×2160 pixels. To transmit UHD video signal 200 across a network having a bandwidth limit of 3 Gbit/s (which is sufficient for a 1080p60 signal), UHD signal 2160p60 may be spatially divided into four portions 202a-d, each having a resolution of 1920×1080 pixels. A separate video stream is generated corresponding to each portion 202a-d. This results in four video portion streams being generated corresponding to the complete UHD video signal 200.

Ancillary data including control instructions may be encoded in a control or data stream, for example, identifying the spatial relationship of the different video portion streams, instructions for combining the video portion streams to reduce visible effects resulting from the division of the original UHD video image into portion video streams and their subsequent recombination to form a corresponding UHD video signal. For example, if the portion video streams are individually compressed for transmission to reduce signal bandwidth requirements or file sizes or otherwise processed, the recombined UHD signal may exhibit visual distortion at the edges between the portion video streams. An ancillary data signal may include instructions or information useful for smoothing such edges to reduce the visual distortion.

Figure 3:
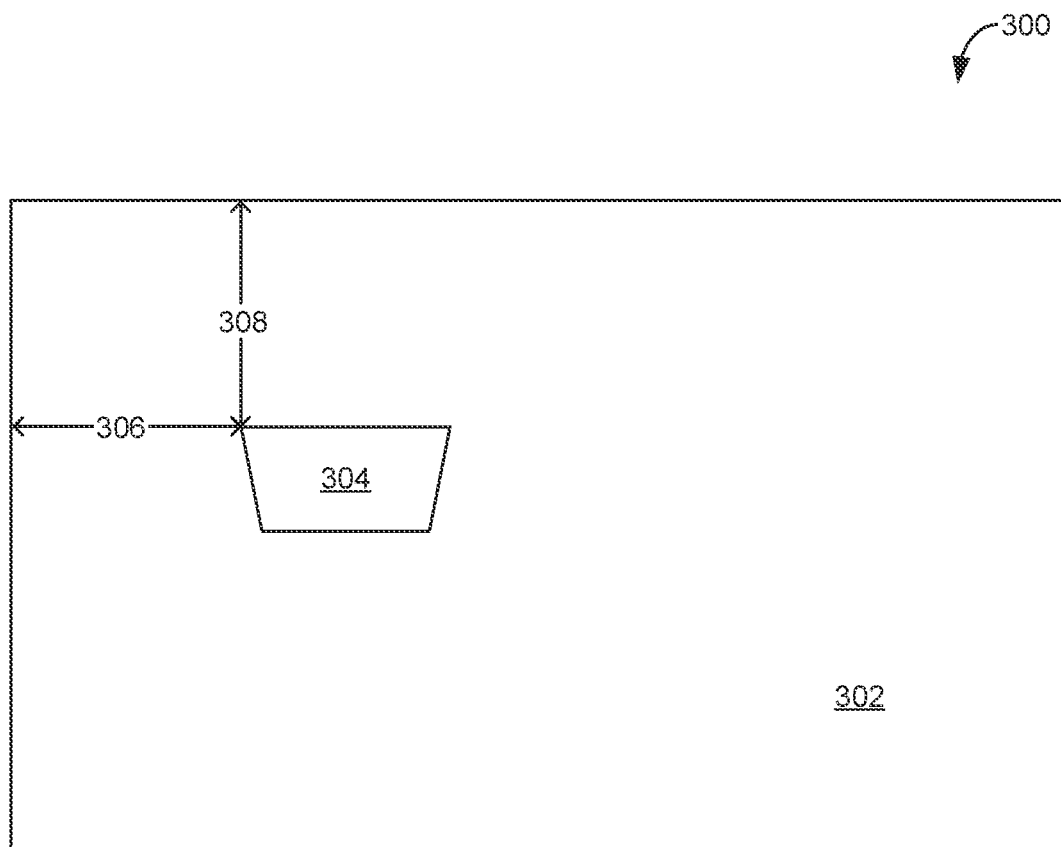
FIG. 3 is an example of a block diagram illustrating a video signal.

Reference is made to FIG. 3, which illustrates another example of video signal 300 that includes multiple video portion streams. Video signal 300 has a base video layer 302 that may contain any type of still or moving image. A small video element or bug 304 is superimposed over base video layer 302 such that base video layer is visible behind the bug 304. Bug 304 may, for example, be a logo, news feed or other text ticker. Bug 304 may move to different positions relative to the base video layer. For example, bug 304 may itself be a still or moving image that moves spatially in response to user input as part of a video game. To encode video signal, video streams for both base video layer 302 and superimposed video bug 304 must be generated. In addition, the spatial relationship between the based stream and the superimposed bug stream must be recorded.

Reference is again made to FIG. 1 comprising a device 102c configured to generate additional versions of video signals recoded in storage server 114 using a video signal generator 120. As illustrated, device 102c is coupled to network 104. To generate a version of a video signal, video signal generator 120 may retrieve some or all of the corresponding content streams and ancillary signals 112 from storage server 114.

For example, video signal generator 120 may retrieve video stream 112v and video closed caption stream 112cv and create a new video stream 112v2 that shows the closed caption text in video closed caption stream 112cv superimposed upon video stream 112v.

Video signal generator 120 may create one or more compressed version of each of the content streams using one or more video compression formats. For example, a video stream may be compressed for reproduction in 2160p60, 1080p60 and other resolutions using appropriate codecs, including comparatively low resolutions suitable for transmission as part of a webpage. One or more of these compressed versions of the video stream may be routed to and recorded in storage server 114 for subsequent use.

Video signal generator 120 may generate additional rescaled versions of the new video stream 112v2 having closed captioning text. Such additional versions may also be routed to and stored in storage server 114.

These examples further illustrate that many versions of a video signal and its component streams and ancillary signals can be easily and rapidly generated to provide different versions of the video signal that may be required in a facility.

Reference is again made to FIG. 1 comprising a device 102d configured to generate a transport stream 112ts using a transport stream generator 122. As illustrated, the transport stream generator 122 is coupled to network 104 to generate transport streams corresponding to signals recorded in storage server 114 or otherwise available in system 100. For example, transport stream generator 122 may retrieve one or more video streams, one or more audio streams and, optionally, one or more ancillary streams corresponding to the video signal 108 and combine them into a transport stream.

Figure 4:
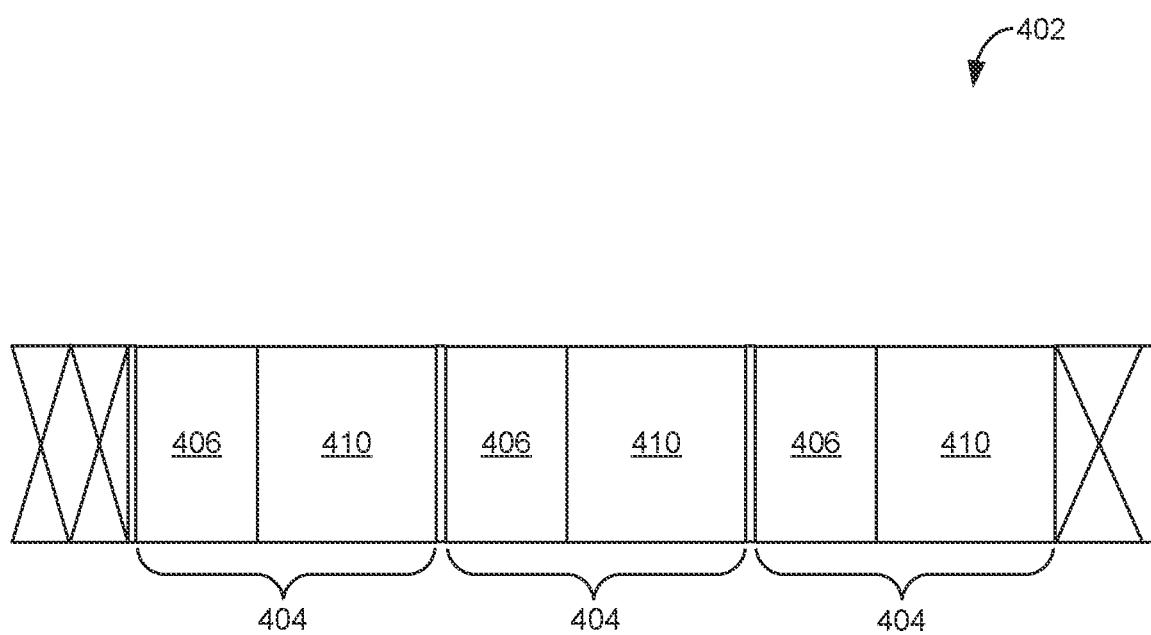
FIG. 4 is an example of a transport stream according to an embodiment.

Reference is now made to FIG. 4, which illustrates a transport stream 402 according to an example embodiment. In the illustrated embodiment, transport stream 402 comprises a series of transport stream packets 404. Each packet corresponds to an elementary stream, which in turn corresponds to a particular video signal. If network 104 has sufficient bandwidth to allow transmission of more than one video signal (which will depend on the format of each video signal), a transport stream may include elementary streams corresponding to each of the video signals.

In the illustrated embodiment, each packet 404 includes a header 406. Each packet may also include a payload 410. In one example embodiment, each packet header 406 includes a packet identifier used to identify the sequence of packets 404 in the transport stream 402. The packet identifier is incremented for each successive packet. Packet header 406 may also include an elementary stream identifier that indicates the particular elementary stream to which the packet applies.

In some embodiments, packet header 406 may additionally include a video signal identifier that identifies the video signal to which the elementary stream corresponds. This field may be included only if the transport stream includes more than one stream, which may correspond to one or more video signals.

Packet header 406 may also include a payload identifier used to indicate whether a payload is included within the packet. The payload identifier may also indicate the type of information in the payload, for example, video, audio, control, ancillary or other information.

In some embodiments, if a packet contains a video payload, the packet header may contain one or more additional fields relating to the payload. Such additional field may include a continuity counter indicating a sequence number of the payload within a particular video stream.

The packet header may also contain a video format indicator indicating the format of video in the payload. For example, the video format indicator may indicate the resolution of the video, identify the encoding format (or codec) used to encode or compress the video or provide other format information relating to the video.

In some cases, the packet header may also contain a color space indicator indicating the color space used to define colors within a video payload. The packet header may also contain a raster size indicator indicating the raster size for the video payload, and/or a bit depth indicator indicating the bit depth used to encode colors in the video payload. The packet header may also contain an HDR indicator indicating whether the video includes HDR video and, optionally, indicating how the HDR video should be reproduced.

In some cases, the packet header may also contain a phase indicator which indicates, for a multi-phase video signal, the specific phase included in the video payload. A standard video signal used in North America may be imaged at a standard frame rate of 60 Hz. Some video signals may be imaged at higher frame rates, which will typically be integer multiples of the standard frame rate. For example, many video signals are imaged at frame rates of 120 Hz, 240 Hz or even higher. To provide compatibility with devices that can only reproduce a signal with a standard frame rate, video signals images at higher frame rates may be encoded in multiple elementary streams, each of which has a frame rate of 60 Hz. The different elementary streams have a phase relationship so that, in order to reproduce the higher frame rate video signals, it is necessary to extract video frames from each of the video elementary streams and display frames them on a rotating basis. The common time base of all of the video elementary streams and the phase indicator allows a reproduction device to correctly order the frames for reproduction at the higher frame rate. At the same time, a reproduction device capable of displaying only a 60 Hz signal can simply decode and display any one of the video elementary streams.

In some cases, the packet header may also contain a spatial position indicator which indicates, for a video portion signal that corresponds to a portion of a larger video signal, the spatial position of the video portion signal relative to the larger video signal. Referring to FIG. 2, a spatial position indicator may indicate the quadrant or portion 204*a-d* in which the video in this transport stream should be reproduced. Referring to FIG. 3, a spatial position indicator for the overlay bug elementary stream may indicate an x pixel offset 306 and y pixel offset 308 relative to the base video layer 302 at which the overlay bug video layer should be reproduced. In other embodiments, the spatial position indicator may indicate a size and/or a shape (circle, ellipse, rectangle, trapezoid etc.) in which the overlay video portion should be reproduced overlying another video signal. The spatial position indicator may vary over time to allow multiple video elements to be displayed in different relative positions.

In various cases, transport stream 400 provides a simplified approach for encapsulating multiple elementary streams corresponding to one or more video signals and control elementary streams to manage the generation, transmission, processing, and reproduction of the video signals in various devices coupled to a video or data communication network.

In some other cases, as discussed herein, multiple elementary streams may be transmitted over a network in a non-transport stream format. For example, multiple content streams may be transmitted in an uncompressed format. This may be accomplished by using suitable SMPTE standards, such as ST-2110 standard.

In some cases, a transport stream 402 may contain a control elementary stream comprising packets 404 that include one or more fields containing control instructions that apply to one or more elementary streams in the transport stream. Control instructions may be contained in the header and/or the payload in packets. Various types of control instructions are discussed in detail below.

Reference is again made to FIG. 1, where one or more devices 102, generate control signals or control streams, which are transmitted over the network 104 uncompressed or generally without being a part of a transport stream. In such embodiments, other signals or streams, such as audio, video signals/streams etc. may also be transmitted over the network 104 uncompressed. For example, ST-2110 standard can be used in some embodiments to transmit the various signals/streams, including the audio, video and control signals/streams, in an uncompressed format. In such embodiments, the various signals or streams may not be multiplexed and can be transmitted over the network 104 independent of each other.

In some embodiments, a control signal or stream may be time locked (or in-bound) to other streams in the network. The control stream may be time locked to other streams by, for example, including time base information synchronized with those other streams (which may be streams corresponding to one or more video signals). Packets containing control instructions in a time locked control stream may be transmitted such that they are applied as indicated by the time base in the packets.

In other embodiments, a control stream may be unlocked (or out-of-bound) from other streams in the network. Packets for such a control stream can be transmitted in advance and may include timing information indicating when a control instruction is to be implemented. Such control instructions may be transmitted in advance of the time at which they are to be applied and a receiving device will record the instruction and apply it as instructed.

Some embodiments may include both time locked and unlocked control streams.

In some cases, the control stream may be time locked to other streams in a transport stream format. In some other cases, the control stream may be time locked to other streams in a non-transport stream format. In the case of unlocked control stream, the control stream may be transmitted in a transport stream format, or may be transmitted uncompressed or otherwise in a non-transport stream format.

In various cases, control stream packets may include one or more fields setting out various control instructions. Such fields may include synchronization instructions such as synchronization operations instructing devices receiving the transport stream to transition from one video stream or audio stream to another.

Control instructions in the control stream may also include network configuration or routing instructions that can be used by devices in a network to route the streams or to otherwise configure the network to achieve a desired network configuration.

Control instructions in the control stream may also include device operation instructions instructing devices receiving one or more streams to process the received streams in a particular manner. For example, an audio reproduction device may be instructed to reproduce some or all audio streams corresponding to a specific program using a specified sound field processor (such as a sound field processor suited for spoken work audio, classical music, a rock concert, an action movie, etc.).

In some cases, the device operation instructions may be provided in a transport stream format and the device operation instructions may be configured to instruct devices receiving the corresponding transport stream to process the transport stream or the content streams in the transport stream in a particular manner. In some cases, the transport stream may contain multiple audio streams in different languages for the same program. The specified sound field processor may be used by the sound reproduction device regardless of which language is selected by a listener.

In some other cases, the control stream comprising the device operation instructions may be provided in a non-transport stream format, or in an otherwise uncompressed format.

In various cases, device operation instructions may instruct one or more devices, such as devices 102 of FIG. 1, to apply a specified video transformation to some or all of the video streams. For example, in some cases, device 102 may be configured to be a video reproduction device or processor and apply a specified video transformation to some or all of the video streams. Device operation instructions could be provided to other devices in communication with devices coupled to the network (through such devices). For example, device operation instructions may provide activation, timing and phase parameters to 3D glasses worn by viewers of a 3D video stream to activate, deactivate and synchronize the 3D glasses as required.

In some embodiments, control instructions may instruct a device to process a video stream previously stored in a storage server, such as storage server 114 of FIG. 1 or otherwise previously transmitted. A receiving device may have previously recorded the previously transmitted video stream or otherwise obtain it through a network, such as network 104 of FIG. 1. In some cases, control instructions may instruct a device to process a video stream within a transport stream previously stored in the storage server 114 or previously received by the receiving device through the network 104.

Figure 5:
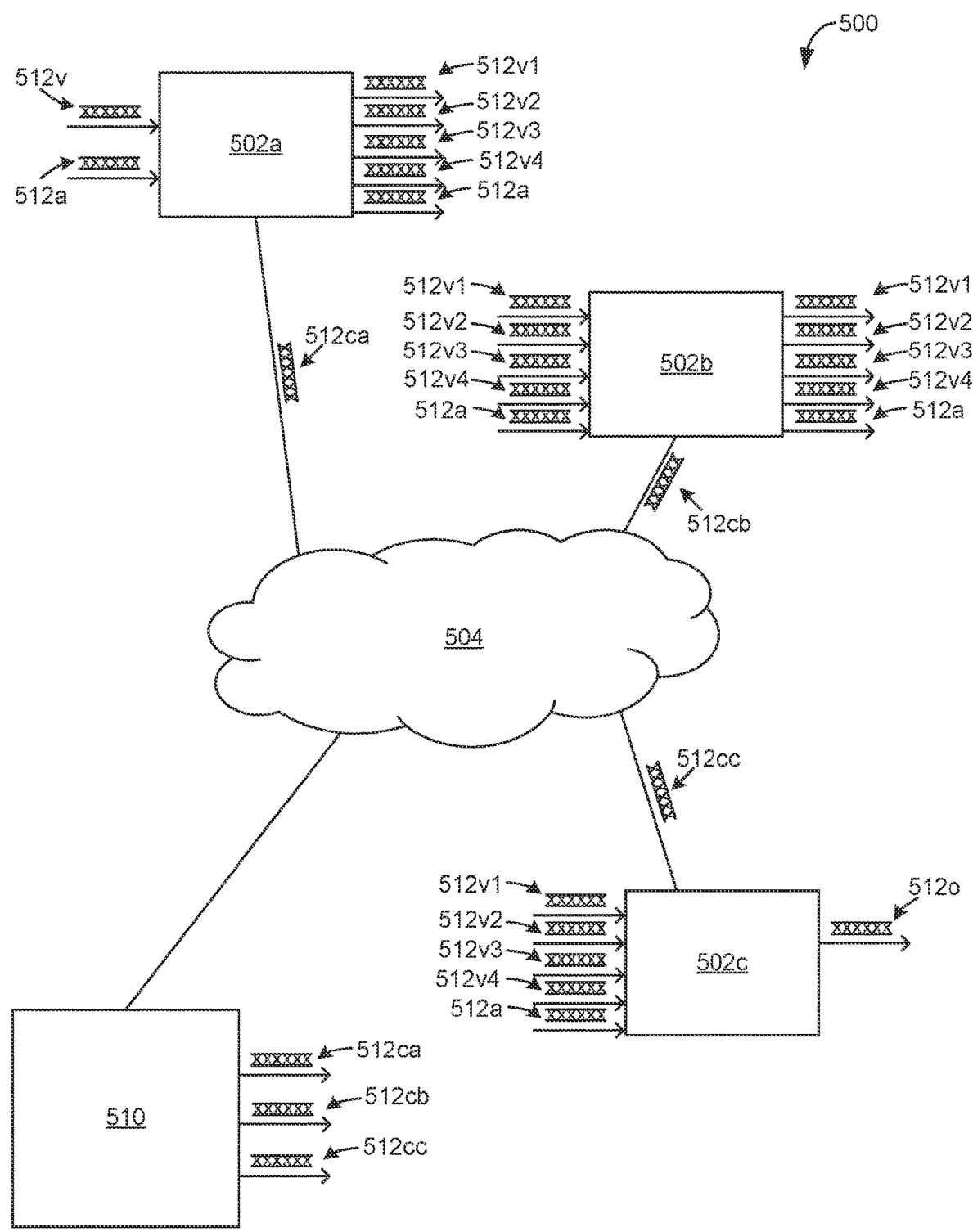
FIG. 5 is an example of a block diagram of a signal transmission system.

Reference is next made to FIG. 5, which illustrates a signal transmission system 500 according to an example embodiment. As illustrated, signal transmission system 500 comprises devices 502, network 504 and a controller 510.

In the illustrated embodiment, controller 510 is configured to transmit control signals to devices 502, where the control signals are related to processing and routing the incoming media signals among other control instructions. Controller 510 may be any server or device having a processor and a memory.

In the illustrated embodiment, signal transmission system 500 comprises a first device 502a, a second device 502b and a third device 502c. The first device 502a may be a signal processing device configured to transform a video signal or video stream from one format to another. Using the example of FIG. 2, first device 502a may be configured to convert a video signal with a resolution of 3840×2160 pixels into four video signals with a resolution of 1920×1080 pixels each.

Second device 502b may be a routing device configured to route the incoming signals from the first device 502a to a third device 502c. Third device 502c may be another signal processing device configured to combine the incoming signals from the second device 502b into an output signal.

As illustrated, first device 502a receives a video stream 512v and an audio stream 512a. The first device 502a may receive the video stream 512v and the audio stream 512a from other devices in the signal transmission system 500, such as a video generation device 102a from FIG. 1.

In the illustrated embodiment, first device 502a is configured to convert the resolution of the incoming video stream 512v. For example, the first device 502a is configured to convert the resolution of the incoming video stream 512v from 3840×2160 pixels into four video signals, each with a resolution of 1920×1080 pixels, similar to the embodiment discussed in FIG. 2. This may be required for bandwidth limitations in that a high resolution video stream cannot be transmitted as is.

In the illustrated embodiment, the controller 510 is configured to transmit control signals via the network 504 to various devices in the signal transmission system 500. The controller 510 is configured to transmit control signal 512ca to control the functionality of the first deice 502a. The controller 510 is configured to transmit control signal 512cb to control the functionality of the second device 502b and the controller 510 is configured to transmit control signal 512cc to control the functionality of the third device 512cc.

The first device 502a processes the incoming video stream 512v and audio stream 512a based on the control signal 512ca from the controller 510. Control signal 512ca specifies instructions for the first device 502a regarding which incoming signals to process, how to process them, and what to output from the first device 502a. Control signal 512ca additionally instructs the first device 502a to specify the destination of the generated output signal or signals from the first device 502a. For example, control signal 512ca identifies the spatial relationship of the different video portion streams generated from the incoming video stream 512v.

In response, the first device 502a generates four video streams of reduced resolution of 1920×1080 pixels. In particular, the first device 502a generates a first video stream 512v1 of resolution 1920×1080 pixels corresponding to portion 202a of FIG. 2, a second video stream 512v2 of resolution 1920×1080 pixels corresponding to portion 202b of FIG. 2, a third video stream 512v3 of resolution 1920×1080 pixels corresponding to portion 202c of FIG. 2, and a fourth video stream 512v4 of resolution 1920×1080 pixels corresponding to portion 202d of FIG. 2.

In the illustrated embodiment, the audio stream 512a remains untouched by the first device 502a. In other words, control signal 512ca from the controller 510 does not instruct the first device 502a to process the audio stream 512a.

The first device 502a then transmits the different video portion streams 512v1, 512v2, 512v3 and 512v4 and the audio stream 512a to the second device 502b via the router 504.

In the illustrated embodiment, the second device 502b is a routing device configured to route the incoming signals or streams to appropriate output ports. The controller 510 transmits control signal 512cb to control the functionality of the second device 502b. Control signal 512cb contains instructions for the second device 502b regarding which port to monitor for incoming signals, where to route the incoming signals and how to route the incoming signals.

Based on the control signal 512cb, the second device 502b routes the incoming different video portion streams 512v1, 512v2, 512v3 and 512v4 and the audio stream 512a to an output port for transmission to the third device 502c via router 504.

In the illustrated embodiment, the third device 502c is another signal processing device configured to combine the incoming signals from the second device 502b into an output signal 512o. Controller 510 transmits control signal 512cc to the third device 502c instructing the third device 502c to combine the various incoming signals to an output signal based on the instructions included in the control signal 512cc. For example, control stream 512cc includes instructions instructing the third device 502c about how to combine the video portion streams 512v1, 512v2, 512v3 and 512v4 in order to reduce visible effects resulting from the division of the original video image comprised in the incoming video stream 512v. Such instructions may, for example, relate the third device 502c to apply a smoothing step to smooth out the edges of the video portion streams 512v1, 512v2, 512v3 and 512v4 to reduce visual distortion.

Based on the control signal 512cc, the third device 502c combines the video portion streams 512v1, 512v2, 512v3 and 512v4 with each other, and with the audio stream 512a to generate an output signal 512o.

In the embodiment of FIG. 5, the various devices in the signal transmission system 500, such as the first device 502a, the second device 502b and the third device 502c, may be required to be synchronized to each other. This may provide the benefits of increased efficiency and decreased error in the operation of the video signal transmission facility. Synchronization of the various devices may be accomplished by synchronizing the clocks of the various devices to each other.

In some cases, SMPTE standard ST-2059 or Precision Time Control protocol may be used to synchronize the clocks of the various devices in the video signal transmission facility, such as the video signal transmission facility 100 and 500.

In some embodiments, buffers are provided to each device, such as device 502a, 502b and 502c, within the signal transmission system to store or buffer respectively the control signals 512ca, 512cb and 512cc received from the controller 510.

In various other embodiments, no buffers are provided to the device 502a, 502b and 502c within the signal transmission system. In such embodiments, the controller 510 transmits the control signals 512ca, 512cb and 512cc at such appropriate times to the respective devices 502a, 502b and 502c that the devices need not buffer the control signals. Instead, the devices read and act on the control signals as soon as they are received from the controller 510. In order to accomplish this, the controller 510 accounts for the various delays in the signal transmission system to calculate the precise time at which the control signals should be transmitted form the controller 510 to the devices 502a, 502b and 502c.

In some cases, the controller 510 takes into consideration the processing delays associated with the devices, such as devices 502a, 502b and 502c, in the signal transmission system. The processing delay relates to the time it takes to carry out the processing instruction contained in the control signal. For example, if a control signal instructs a device to convert the resolution of an incoming video signal, the time it takes for the device to convert the resolution will be taken into account as the processing delay.

In some other cases, the controller 510 takes into consideration the control latency delays associated with the devices, such as devices 502a, 502b and 502c, in the signal transmission system. The control latency delay relates to the time it takes for a device to react to a control signal received by the device. In other words, the time between receiving the control signal by the device and carrying out the instructions contained in the control signal by the device is captured by the control latency delay.

In some other cases, the controller 510 takes into consideration the network delays associated with the signal transmission system. Network delay captures the time it takes for the control signal transmitted by the controller 510 to reach from the controller 510 to the respective device. In other words, network delay accounts for the time it takes for a control signal to traverse the network 504.

In various cases, the controller 510 takes into account some or all of the processing delay, control latency and network delay to determine when the control signal should be transmitted from the controller 510 and when it should reach the respective device so that the respective device can timely receive the control signal to apply the instructions contained in the control signal on the incoming video, audio and/or ancillary streams.

Figure 6A:
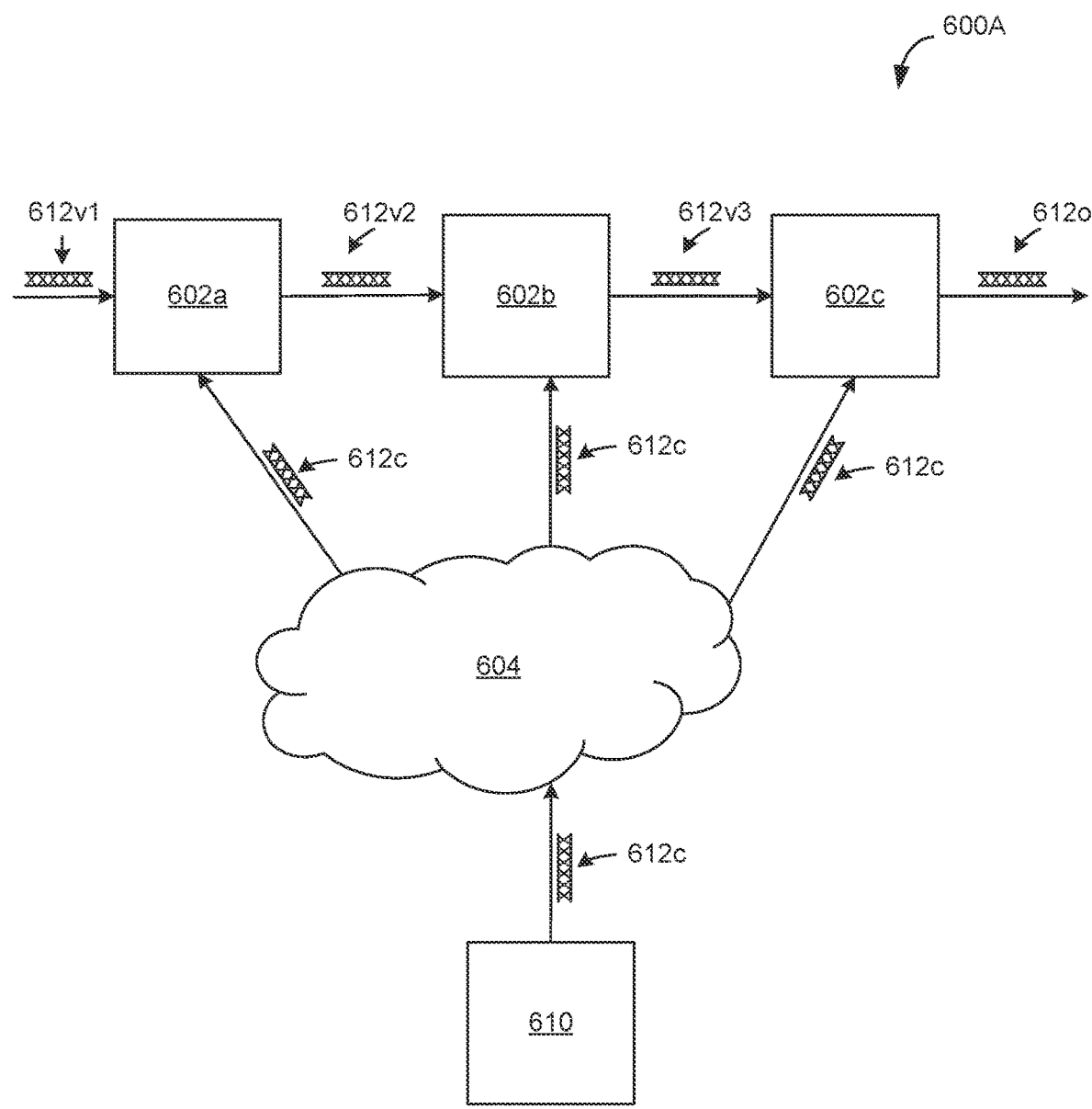
FIG. 6A is another example of a block diagram of a signal transmission system.
Figure 6B:
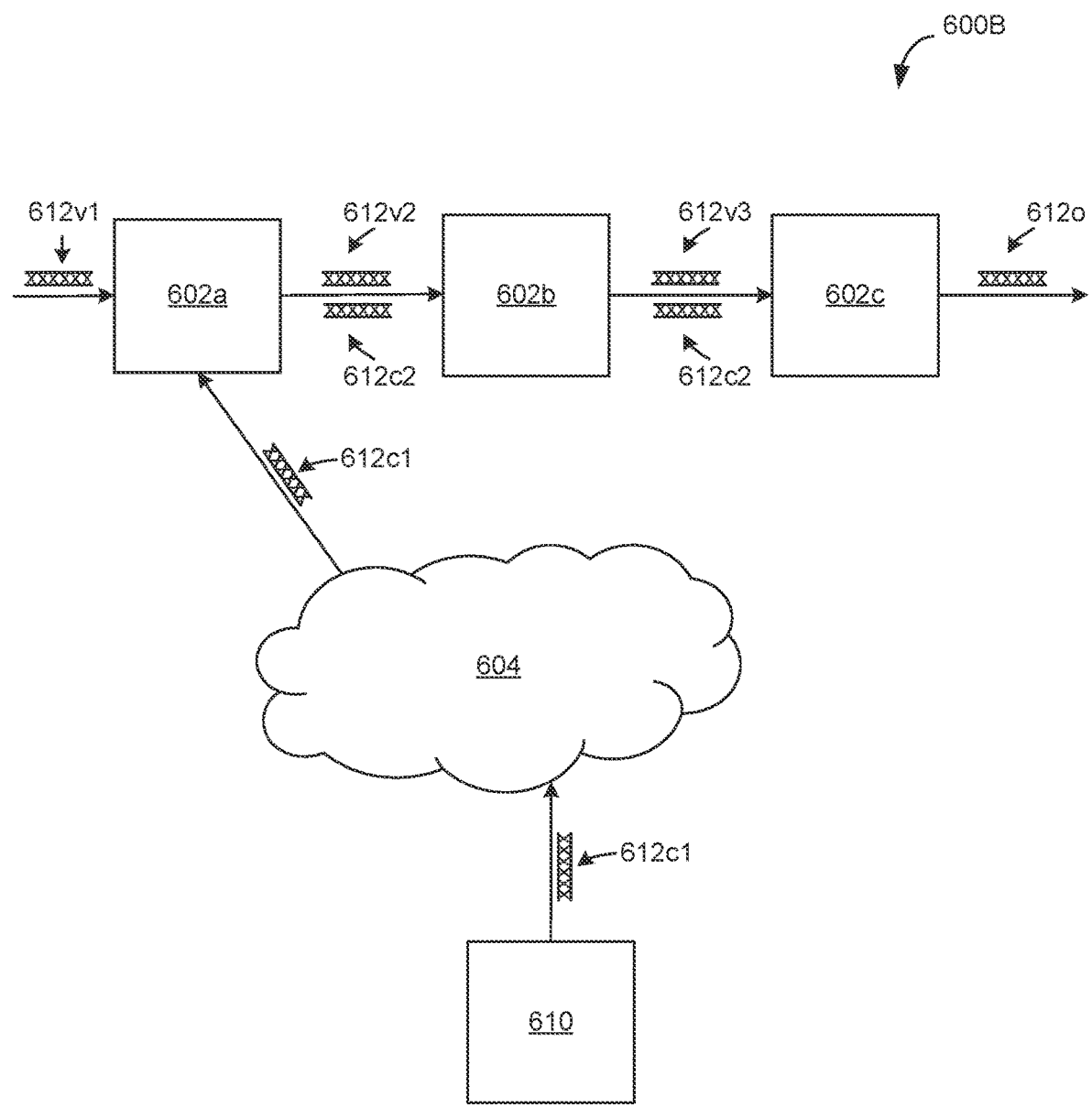
FIG. 6B is a further example of a block diagram of a signal transmission system.
Figure 6C:
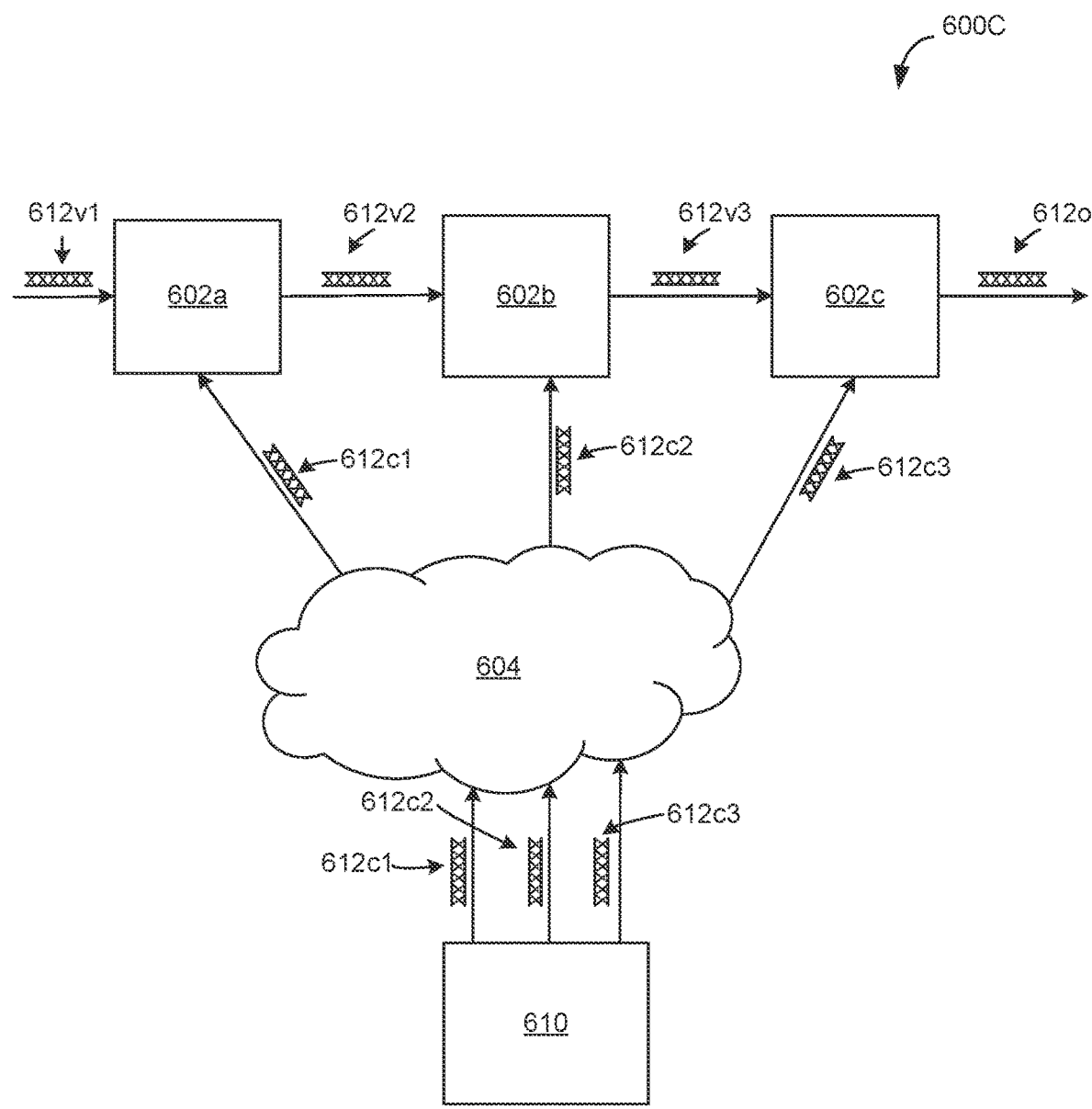
FIG. 6C is another example of a block diagram of a signal transmission system.

Reference is next made to FIGS. 6A-6C, which illustrates signal transmission systems according to various examples. Signal transmission systems 600A, 600B, 600C of FIGS. 6A, 6B and 6C, respectively, disclose different examples of transmitting control signals from controller 610 to various devices in the signal transmission system. As illustrated, signal transmission systems 600A, 600B and 600C comprises a first device 602a, a second device 602b, a third device 602c, network 604 and a controller 610.

In the example embodiment illustrated in FIG. 6A, controller 610 transmits a control signal 612c which contains the control instructions for all the devices 602a, 602b and 602c in the signal transmission system 600A. In such embodiments, the control signal 612c may be a multiplexed signal combining the various instructions for the various devices.

Control signals 612c transmitted from controller 610 is transmitted to all the devices 602a, 602b and 602c simultaneously, and each device is configured to receive and interpret the control signal 612c and extract the control instructions targeted for that device. In the illustrated embodiment, the first device 602a receives a video stream 612v1. The first device 602a operates (e.g. processes, routes etc.) the incoming video stream 612v1 based on the instructions in the control signal 612c directed to the first device 602a. Instructions directed to or meant for the other devices are not interpreted by the first device 602a. The first device then generates an output video stream 612v2, which is transmitted to the second device 602b.

The second device 602b receiving the video stream 612v2 operates on this signal based on the instructions in the control signal 612c meant for the second device 602b. The second device 602b then generates the video stream 612v3.

The third device 602c receives the video stream 612v3 and operates on it based on the control instructions contained in the control signal 612c that are meant for the third device 602c. In the illustrated embodiment, the third device 602c operates on the video stream 612v3 and generates an output signal 612o.

In this embodiment, the control signal 612c is received by all the three devices 602a, 602b and 602c simultaneously, and for downstream devices, such as devices 602b and 602c, the control signal 612c are buffered. The buffered control signal 612c is then accessed by the respective device when the media stream, which is operated on, is received by that device.

Reference is next made to FIG. 6B illustrating a signal transmission system 600B, where the control signal 612c1 is only transmitted form the controller 610 to the first device 602a in the system 600B. In this embodiment, the control signal 612c1 or a variant of it, such as control signals 612c2, are then transmitted from one device to another along with the video, audio and/or ancillary streams. In some cases, the control signal is multiplexed with the content stream and transmitted as a multiplexed signal from one device to the next.

In the illustrated embodiment, the first device 602a received the control signal 612c1 form the controller 610 and based on the control instructions contained in the control signal 612c1, the first device 602a operates on the incoming video signal 612v1.

The first device 602a then generates a second video signal 612v2 along with a control signal 612c2. Control signal 612c2 may be the same as the control signal 612c1, or it may be a combination of ancillary or control stream generated by the first device 602a and the control signal 612c1.

The second device 602b receives the second video signal 612v2 and the control signal 612c2 and operates on the second video signal 612v2 based on the instructions contained in the control signal 612c2.

The second device 602b then generates a third video signal 612v3, and transmits the signal 612v3 along with the control signal 612c2, or a variant of the control signal 612c2 to the third device 602c. The variant of the control signal 612c2 may be created by combining or multiplexing the control signal 612c2 and any ancillary or control stream generated by the second device 602b.

The third device 602c receives the third video signal 612v3 and a control signal 612c2, and operates on the third video signal 612v3 based on the control signal 612c2. In the illustrated embodiment, the third device 602c generates an output video signal 612o.

Reference is next made to FIG. 6C illustrating a signal transmission system 600C where different control signals are transmitted to different devices at different times. In this embodiment, the controller 610 generates and transmits a first control signal 612c1 to the first device 602a at a first time. The controller 610 generates and transmits a second control signal 612c2 to the second device 602b at a second time, and a third control signal 612c3 to the third device 602c at a third time.

The first, second and third times correspond to the time at which the content streams, such as video and/or audio streams are received by the respective device. In this embodiment, the use of buffers for each device is thus eliminated.

As illustrated, the first device 602a receives a first video stream 612v1 and a first control signal 612c1 simultaneously or at almost the same time so that the use of buffers (for buffering the control signal 612c1 and/or the content stream 612v1) is eliminated. In any case, the control signal 612c1 is received before the content stream 612v1 such that as soon as the control stream 612v1 is received, the first device 602a operates on it based on the control signal 612c1. The first device 602a generates a second video stream 612v2.

Next, the controller 610 transmits a second control signal 612c2 to the second device 602b either simultaneously or almost at the same time as the content stream 612v2. The controller 610 takes into account the processing time of the first and the second devices 602a, 602b, control latencies associated with the first and the second devices 602a, 602b and network delays in the system 600C, The second device 602b operates on the second video stream 612v2 based on the control signal 612c2 and generates a third video stream 612v3.

The controller 610 transmits a third control signal 612c3 to the third device 602c either simultaneously or almost at the same time as the content stream 612v3. The controller 610 takes into account the processing time of the first, second and the third devices 602a, 602b, 602c, control latencies associated with the first, second and the third devices 602a, 602b, 602c and network delays in the system 600C, The third device 602c operates on the third video stream 612v3 based on the control signal 612c3 and generates an output content stream 612o.

Various embodiments of the invention have been described here by way of example only. Various modifications and variations may be made to these example embodiments without departing from the spirit and scope of the embodiments, which is limited only by the appended claims which should be given the broadest interpretation consistent with the description as a whole.

We claim:

1. A system of managing media streams over an IP network, the system comprising:
   a first device configured to:
      extract a first instruction from a first control signal;
      process a received media stream based on the first instruction to generate a transformed media stream;
      generate a second control signal for a second device;
      combine the second control signal with the transformed media stream to generate a combined signal; and
      transmit the combined signal comprising the transformed media stream and the second control signal to the second device;
   the second device coupled to the first device and the second device being configured to:
      receive the combined signal from the first device;
      extract a second instruction corresponding to the second device from the second control signal contained in the combined signal; and
      process the transformed media stream based on the second instruction contained in the second control signal; and
   a controller coupled, over the IP network, to the first device, the controller being synchronized with the first device, wherein the controller is configured to:
      generate the first control signal, wherein the first control signal includes instructions for the first device and the second device;
      determine a time of transmission of the first control signal to the first device such that the first control signal is received by the first device simultaneously with the received media stream; and
      transmit the first control signal at the time of transmission to the first device.

2. The system of claim 1, wherein the first device being configured to generate the second control signal comprises:
   the first device being configured to generate the second control signal by combining the first control signal with a control stream generated by the first device.

3. The system of claim 1, wherein the controller is configured to determine a processing delay associated with the first device and determine the time of transmission based on the processing delay.

4. The system of claim 1, wherein the controller is configured to determine a network delay for the IP network and determine the time of transmission based on the network delay.

5. The system of claim 1, wherein the controller is configured to determine a control delay associated with the first device and determine the time of transmission based on the control delay.

6. The system of claim 1, wherein the first device and the controller are synchronized with each other based on a PTP protocol.

7. The system of claim 1, wherein the first device configured to transmit the transformed media stream and the second control signal to the second device comprises:
   the first device being configured to multiplex the second control signal with the transformed media stream and transmit the multiplexed signal.

8. The system of claim 1, wherein the first device is configured to transform the received media stream to generate a plurality of media stream portions, each media stream portion comprising a plurality of media packets and corresponding to a portion of the received media stream.

9. A method of managing media streams over an IP network, the method comprising:
   receiving a media stream at a first device, the first device synchronized with a controller coupled, over the IP network, to the first device;
   receiving, by the first device, a first control signal from the controller, the first control signal being transmitted from the controller to the first device at a time of transmission such that the first control signal is received by the first device simultaneously with the media stream;

extracting, by the first device, a first instruction from the first control signal;

processing, by the first device, the media stream based on the first instruction within the first control signal;

generating, by the first device, a second control signal for a second device;

combining, by the first device, the second control signal with the transformed media stream to generate a combined signal; and transmitting, by the first device, the combined signal comprising the transformed media stream and the second control signal, over the IP network, to the second device, wherein the second device coupled to the first device is configured to:

extract a second instruction corresponding to the second device from the second control signal contained in the combined signal; and process the transformed media stream based on the second instruction contained in the second control signal, and wherein the controller is further configured to determine the time of transmission of the first control signal to the first device, where the first control signal includes instructions for both the first device and the second device.

10. The method of claim 9, wherein transmitting, by the first device, the transformed media stream and the second control signal to the second device comprises:

multiplexing the second control signal with the transformed media stream and transmitting the multiplexed signal.

11. The method of claim 9, wherein processing the media stream based on the first control signal comprises:

transforming the media stream to generate a plurality of media stream portions, each media stream portion comprising a plurality of media packets and corresponding to a portion of the media stream.

12. A method of managing media streams over an IP network, the method comprising:

generating, by a controller, a first control signal for a first device coupled with the controller over the IP network, the controller and the first device being synchronized with each other and the first control signal being configured to cause the first device to:

process a media stream received at the first device based on the first control signal to generate a transformed media stream;

generate a second control signal for a second device; and transmit the transformed media stream and the second control signal, over the IP network, to the second device, wherein the second control signal is configured to cause the second device to process the transformed media stream based on the second control signal;

determining, by the controller, a time of transmission of the first control signal to the first device such that the first control signal is received by the first device simultaneously with the media stream; and transmitting, by the controller, the first control signal at the time of transmission to the first device.

13. The method of claim 12, wherein determining the time of transmission of the first control signal further comprises:

determining, by the controller, a processing delay associated with the first device; and determining, by the controller, the time of transmission based on the processing delay.

14. The method of claim 12, wherein determining the time of transmission of the first control signal further comprises:

determining, by the controller, a network delay for the IP network; and determining, by the controller, the time of transmission based on the network delay.

15. The method of claim 12, wherein determining the time of transmission of the first control signal further comprises:

determining, by the controller, a control delay associated with the first device; and determining, by the controller, the time of transmission based on the control delay.

16. The method of claim 12, wherein the first control signal includes instructions for the first device and the second device.

* * * * *